US006436225B1

(12) United States Patent
Papsin, Jr.

(10) Patent No.: US 6,436,225 B1
(45) Date of Patent: Aug. 20, 2002

(54) N-METHYLOL-BASED POLYACRYLIC DISPERSION AND POLYALKYLENEIMINE ADHESIVES FOR FILM LAMINATING

(75) Inventor: George A. Papsin, Jr., Lino Lakes, MN (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 0 days.

(21) Appl. No.: 08/868,353

(22) Filed: Jun. 3, 1997

(51) Int. Cl.[7] .............................................. C09J 101/00
(52) U.S. Cl. ..................... 156/331.8; 524/186; 524/502
(58) Field of Search ........................ 156/331.8; 524/186, 524/502

(56) References Cited

U.S. PATENT DOCUMENTS

| 3,230,135 | A | | 1/1966 | Hurst |
| 3,457,101 | A | | 7/1969 | Hermitte et al. |
| 3,480,506 | A | | 11/1969 | Hart et al. |
| 3,507,685 | A | | 4/1970 | Banerjee |
| 3,607,544 | A | | 9/1971 | Earner et al. |
| 4,082,884 | A | * | 4/1978 | DeLong ...................... 524/502 |
| 4,529,772 | A | * | 7/1985 | Drunchke et al. ....... 156/331.8 |
| 4,980,404 | A | | 12/1990 | Aydin et al. |
| 5,500,470 | A | * | 3/1996 | Mirle et al. ................. 524/502 |
| 5,508,100 | A | * | 4/1996 | Wierer et al. ............. 156/331.8 |

FOREIGN PATENT DOCUMENTS

| EP | 0 271 033 A2 | 6/1988 |
| JP | 04298717 | 5/1994 |
| JP | 05148496 | 12/1994 |

* cited by examiner

*Primary Examiner*—John J. Gallagher
(74) *Attorney, Agent, or Firm*—Bin Su

(57) ABSTRACT

The present invention relates to film laminating adhesive (FLA) compositions comprising an N-methylol-based polyacrylic dispersion and polyalkyleneimine (PAI) and laminates thereof, a method for bonding substrates together using these compositions and a method for preparing these compositions.

24 Claims, No Drawings

N-METHYLOL-BASED POLYACRYLIC DISPERSION AND POLYALKYLENEIMINE ADHESIVES FOR FILM LAMINATING

FIELD OF THE INVENTION

The present invention relates to a film laminating adhesive (FLA) composition comprising an N-methylol-based polyacrylic dispersion and polyalkyleneimine (PAI) and laminates thereof, a method for bonding substrates together using these compositions and a method for preparing these compositions.

BACKGROUND OF THE INVENTION

In order to sufficiently bond low-dyne substrates together, most applicators employ a two-coat system. The first coat is usually a primer and the second coat is an adhesive. Polyethyleneimine (PEI) is one such primer that is commercially available. Although PEI is a powerful adhesion promoter, it is commonly used only as a primer in very thin film thickness because of its high cost. Thus, it is more economical to employ a conventional synthetic polymeric adhesive to bond the desired substrates together. An example of a PEI application in two-coat systems is described in U.S. Pat. No. 3,507,685 which discloses a two-step treatment of cellulosic base material with polyethyleneimine as an anchor coating and an aldehyde as a crosslinking agent. Another example is U.S. Pat. No. 3,480,506 which discloses a process for preparing laminated wood structures using a thin sheet or film of modified polyolefin and a solution of polyalkyleneimine as an intermediate adhesion promoter coating. These applications use PAI in conjunction with another component in a two-step or two-coat process.

Other prior art references have described the addition of PEI to promote adhesion. U.S. Pat. No. 3,607,544 disclosed the addition of PEI to promote coating between sheets, foils, films and top coating to improve the bond between respective layers. U.S. Pat. No. 3,230,135 disclosed coating paper materials with polyimine to improve adhesion and heat strength. The paper web is coated with a thin film of polyethyleneimine composition prior to extrusion coating with polyethylene film. U.S. Pat. No. 3,457,101 disclosed thermosealable polyolefin film with multilayer coating of a) primer layer which is formed from a partial reaction product of an amine with an oxirane derivative, and b) a layer film or foil of vinyl or vinylidene polymer or copolymer.

The prior art compositions have performed satisfactorily for their intended purpose. However, for simplicity and efficiency, there is a need for a one-coat system that accomplishes the same result as a two-coat primer/adhesive system with improved adhesion and cohesive strength. None of the preceding references teach or suggest the use of an N-methylol-based polyacrylic dispersion/PAI blend as a stable system for adhering low-dyne substrates. The present inventor has found that the addition of PAI to an N-methylol-based polyacrylic dispersion can increase the adhesive strength (peel strength) of hard to bond surfaces, as well as increasing the cohesive strength without compromising adhesive strength.

SUMMARY OF THE INVENTION

The present invention provides a stable adhesive comprising a blend of N-methylol-based polyacrylic dispersions with PAI which produces the same or better adhesion between film type structures as a two-coat PAI primer/adhesive system. The level of the adhesion in laminated structures can be equal to or greater than the bonds obtained with other adhesives such as polyurethane dispersions.

This invention relates specifically to a blend of aqueous N-methylol-based polyacrylic dispersions and polyalkyleneimine (PAI). The polyacrylic dispersion comprises free radically polymerized acrylic and N-methylol-based monomers. The N-methylol-based monomer as used herein has the following general structure:

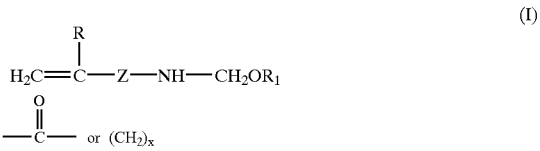

(I)

wherein
R=hydrogen or $C_1$–$C_4$ alkyl
x=0–6 units; and
$R_1$=hydrogen or $C_1$–$C_4$ alkyl These PAI-polyacrylic blends machine well, are extremely stable, and have a good pot life. The addition of PAI to an N-methylol-based polyacrylic dispersion dramatically increases the adhesive and cohesive strength several fold in film laminating adhesives as compared to the base polymer alone.

In one aspect, the invention provides a film laminating adhesive composition for dry bonding films for flexible packaging.

It is another object of the invention to provide a method for bonding substrates using an N-methylol-based polyacrylic dispersion and polyalkyleneimine as an adhesive for use in film laminating.

It is another object of the invention to provide a film laminating adhesive which attains excellent stability and bonding with difficult to bond substrates.

It is yet another object of the invention to provide a film laminating adhesive with increased cohesive strength without compromising adhesive strength.

It is still another object of the invention to provide laminates comprising a substrate laminated to another substrate, of the same or different material using the film laminating adhesive composition.

These, as well as other objects and advantages of the invention, are accomplished by providing blends of N-methylol-based polyacrylic dispersions and polyalkyleneimine as an adhesive for use in film laminating.

DETAILED DESCRIPTION OF THE INVENTION

The present invention relates to a one-component blend of N-methylol-based polyacrylic dispersions and polyalkyleneimine that produces the same effect as a two-step two component system for film laminating adhesive. The invention provides a film laminating adhesive having significant adhesive strength and improved cohesive strength.

The term "film" includes any substrate which can be adhered to another substrate of the same or different material with the present adhesive composition to form a flexible package or laminate. Included as "film" are any type of naturally occurring and synthetic materials. Representative examples of such materials and their forms include the following: paper, glassine paper, paperboard, fabrics, plastic, metal foil, metallized plastic film or most any other solids in the form of a film, sheet or paper. Plastic films include polyolefin films such as polyethylene and polypropylene, as well as polyamide or polyester film. Generally, these plastic films have low energy surfaces and are difficult to adhere to one another. Therefore, the surfaces are normally activated by corona discharge, flame oxidation, chemical etching or primer coating in order to promote adhesion. The films that are employed in the present invention are unlimited, but more specifically, the PAI-film laminating adhesive will be mainly used to bond flexible film to flexible film or paper. The adhesive of the present invention will be used for hard to bond surfaces, e.g., low dyne level substrates and anywhere a higher cohesive strength is needed. Examples of flexible packaging or laminates are dry snack food bags such as pretzel or potato chips, decorative ribbons or shopping bags.

The term "laminate" includes structures that are manufactured by lamination using the present adhesive composition comprising N-methylol-based polyacrylic dispersions/PAI blend and films. A laminate structure typically comprises a substrate of the same or different films which are laminated to each other by coating the primary film or web with the present adhesive composition. The secondary web is then laminated to the primary web after the adhesive is dried.

The term "effective amount" means an amount sufficient to accomplish the intended purpose.

The term "$T_g$" or glass transition temperature as used herein means the temperature at which a polymer changes from a glassy, brittle solid to a very high viscosity liquid. "$T_g$" can be calculated by a well known mathematical procedure, as described, for example, by T. Nielsen in "Mechanical Properties of Polymers", Reinhold Publishing Co., 1962, pp 22–27.

The term "acrylic" can include monoethylenically unsaturated monomers including acrylic, methacrylic, vinyl and allylic monomers, acrylate or methacrylate monomers. Additionally, acrylics can include acids, esters, amides and substituted derivatives thereof. Generally, the preferred acrylates are $C_1$–$C_{20}$ alkyl acrylates or methacrylates. Examples of such acrylates include ethyl(meth)acrylate, methyl(meth)acrylate, isobornyl(meth)acrylate, isooctyl (meth)acrylate, 2-ethyl hexyl(meth)acrylate, isobutyl(meth) acrylate, butyl(meth)acrylate, isodecyl(meth)acrylate, lauryl (meth)acrylate, stearyl(meth)acrylate and hexyl(meth) acrylate. The term "(meth)acrylic" includes both acrylic and methacrylic. The preferred amount of acrylate is at least about 1% to about 99.6% of polymer weight, more preferably from about 40% to about 99% of polymer weight. In addition, styrene, alpha-methyl styrene, alpha-olefin monomers such as 1-hexene and 1-octene and vinyl monomers such as neodecanoic acid, ethenyl ester and vinylamine may be used in place of acrylic or methacrylic.

The N-methylol-based polyacrylic dispersion is formed from at least one ethylenically unsaturated monomer and N-methylol-based monomer. The N-methylol-based monomers include, but are not limited to, N-methylol(meth) acrylamides, with the most preferred monomer being N-methylol acrylamide. The N-methylol-based monomers may be substituted with alcohols to form N-alkoxy modified N-methylol-based monomers including N-methoxy methyl acrylamide. The N-methylol-based monomer is present in the acrylic polymer at least in a range of from about 0.5% by weight to about 3% by weight based on polymer solids.

A combination of N-methylol-based acrylamide, with any combination of the above monomers to produce a copolymer having a calculated $T_g$ of no greater than +25° C., are employed in the present invention. A combination of monomers is chosen to produce the best balance of properties, as measured by adhesion, cohesive strength and tack. The preferred monomers in the acrylic polymer elements are butyl acrylate, methyl(meth)acrylate, (meth)acrylate, N-methylol(meth)acrylamide and N-methyl(meth) acrylamide. The preferred $T_g$ is in the range of about 0° C. to about −34° C. for film laminating.

The term "polyalkyleneimine" is used for the purpose of this invention to include simple derivatives of these compounds as a result of the substitution of the aziridine ring of the monomer with lower alkyl groups such as methyl, ethyl, propyl and butyl, and lower alkoxy groups such as methoxy groups, ethoxy, propoxy and butoxy.

The polyalkyleneimine as used herein is represented by the following structure:

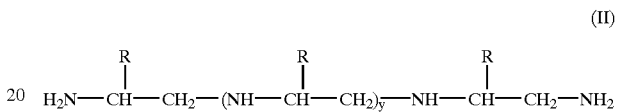

(II)

wherein
R=hydrogen or 1–carbon atoms; and
Y=30–60 units

A preferred polyalkyleneimine is polyethyleneimine (PEI). The number average molecular weight (MN) of PEI can be any molecular weight. The number average molecular weight of commercial PEI is about 700–70,000 in aqueous solution with solids ranging from 33%–100%. A most preferred number average molecular weight of polyalkyleneimine is in a range of about 1,000 to 2,000 MN to produce the best balance of effects. High number average molecular weight PEI's include PEI with an average number of above 2,000, e.g., Corcat™ P-600, Lupasol™ P, Lupasol™ water free and Epomin™ P-1000. Low number average molecular weight PEI's include PEI with an average molecular weight of below 1,000, e.g., Lupasol™ FG and modified PEI such as Lupasol™ SC-86X. The function of polyalkyleneimine is to promote adhesion and cohesive strength. A preferred amount of polyethyleneimine is at least from about 0.5% by weight to about 8% by weight based on total solids.

The PAI and N-methylol-based polyacrylic dispersion are blended together at ambient temperature. The straight addition of PAI to an N-methylol-based polyacrylic dispersion usually results in grit or gelling if the strong acid, which may be present in the N-methylol-based polyacrylic dispersion, is not neutralized first. If these acid groups are more than 3% by weight of the polymer backbone, the result is usually high initial viscosity which can drift towards even higher values. Viscosity can of course be adjusted by the solid content of the dispersion to a certain extent, but too low a solid content can lead to increased dry times, thus slowing the laminating process. The preferred viscosity is of at least about 10 to about 200 cPs. On the other hand, a viscosity of greater than 200 cPs may be difficult to run on gravure type cylinder laminators because materials do not flow on the substrate unless specially prepared. The preferred total solids content of the adhesive is from about 35% by weight to about 55% by weight. A solid content of less than about 35% can be detrimental in that increased solvent often extends the dry times making the laminating process less efficient. Alternatively, a solids content greater than about 55% by weight often increases the composition's viscosity which can cause misting of the adhesive during the laminating process to adversely affect coat weights.

Suitable buffers are pH adjusting agents which include alkali metal, hydroxides, carbonates and the like.

Suitable initiators include radical polymerization initiators such as persulfates, organic peroxides, azoisobutylnitrile or redox type radical generators, including an oxidizing agent and a reducing agent. Examples are hydrogen peroxide which comprises the oxidizing agent, and sodium bisulfate which comprises the reducing agent.

Suitable surfactants are anionic such as alkali salts of fatty acids and of aryl and alkyl sulfonic acid, e.g., sodium sulfonate of ethoxylated phenol; cationic such as alkyl amine hydrochloride and alkyl amine halide; or nonionic such as alkyl glycosides and saccharose esters of fatty acids. Although surfactants are optionally added, a preferred amount of surfactant is at least about 0.2% by weight to about 2% by weight.

Optional components of the adhesive composition of the present invention are thickeners, surfactants, bactericides, buffers, tackifying agents, stabilizing polymers and chain transfer agents and crosslinking monomers.

Preparation of the Polymeric Latex

The polymeric latex is prepared by known methods of emulsion polymerization. The aqueous emulsion polymers are prepared in a standard way by feeding a main feed of an aqueous monomer emulsion, cofeed containing the buffer and an initiator. With time, such compositions yield a latex polymer.

The acrylic copolymer is an aqueous emulsion polymer composed mainly of acrylic and/or methacrylic, with or without other monomers previously mentioned and N-methylol acrylamide. An example of the polymer is PN-3830-F which is commercially available N-methylol functional acrylic emulsion from H. B. Fuller Company, St. Paul, Minn.

The main factors in this invention are that the base polymers contain low levels of N-methylol acrylamide and are neutralized with ammonium hydroxide or sodium hydroxide or any base to about pH=7 before PEI is added. PEI is then cold blended to the neutralized base polymer and a stable blend is formed. The molecular weight (MN) of PEI can be any molecular weight. A most preferred number average molecular weight is in a range of about 1,000 to 2,000 MN to produce the best balance of effects. An example of PEI-PSA blend is PD-8042, which is commercially available from H. B. Fuller Company, St. Paul, Minn.

Commercially available PEIs in the 1000–2000 molecular region are Corcat™ P-12 (MN=1200) and Lupasol™ G-35 (MN=1800). High molecular weight PEIs like Corcat™ P-600 (MN=60,000) do not always produce long term stable blends. Low number average molecular weight PEIs, e.g., Lupasol™ FG (MN=700) do not always produce the same performance as the 1000–2000 number average molecular weight PEIs.

Preparation of the Laminate

As mentioned before, the adhesives can be applied to a wide variety of substrates including paper, polyethylene, polypropylene, polyester, nylon, ethylene, vinylacetate, cellophane, polyvinyl chloride, metallized films, aluminum foil and mixtures thereof. The adhesives of the present invention may be coated onto flexible substrates using conventional coating units. A suitable unit includes the geometric C/L-400 coater/laminator from Geometric Machines (Edison, N.J.). The laminating process typically involves roll coating the adhesive using a gravure cylinder, onto a first flexible substrate at an application rate of about 0.25 g/meters$^2$ to about 10.0 g/meters$^2$, based on solids. After the adhesive has been applied, it was dried at a temperature of about 25° C. to about 200° C. using methods known in the art, i.e., circulating ovens, gas impingement drier, infrared radiation and heat lamps. The dry coated substrate is then mated with a second flexible substrate or web, which may be the same or different from the first substrate. Typically, the substrates are mated together using a nip pressure of about 1.4 kgs/sq. cm. to about 4.2 kgs/sq. cm. and a nip temperature of about 25° C. to about 200° C. for 1–2 seconds.

The peel adhesion is measured by a 180° test which is known in the art, namely the Pressure Sensitive Adhesive Tape Council-1 (PSTC-1). The cohesive strength (shear resistance) was measured by PSTC-7.

Humidity Resistance Test

The Humidity Resistance Test is performed by exposing the bonded laminates to 100% relative humidity at 65.5° C. The laminates, e.g., polypropylene to polypropylene were prepared using a geometric C/L-400 coater laminator unit run at a rate of 91.4 meters/min (300 ft/min). The adhesives were coated onto polyethylene terephthalate substrate using a rotogravure set at a level of 453.6 grams solid material per 91.4 meters$^2$ (1.0 lbs/300 ft$^2$). The coated substrate was then passed through a 4.57 meter (15 foot) drying oven, set at a temperature of 65.5° C. and then mated with aluminum foil using a nip temperature of 65.5° C. and a nip pressure of 2.8 kgs/sq. cm. (40 psi). The bonded laminates were used to prepare 10.16 cm. by 10.16 cm. pouches. The pouches were then filled with water, allowed to cure for one day or seven days and placed in a test chamber at ambient room temperature having 100% relative humidity. After one day and seven days, the laminates were visually inspected for signs of delamination or tunneling. The laminates "pass" the humidity test if no visible signs of delamination or tunneling are detected.

EXAMPLE 1

Preparation of Acrylic/PEI blend (PD-8042) as a Film Laminating Adhesive

Into a clean mixing vessel, PN-3830-F was added and agitated without foaming. A separate solution of 50% NaOH and water were mixed together to form a uniform solution. The solution was then added to the stirred PN-3830-F until the pH was in the range of 7–8. Lupasol™ G-35 was then added to the mixing vessel and stirred an additional ten minutes. The % of each ingredient in the above formulation is as follows:

| | |
|---|---|
| PN-3830-F | 94.4583% |
| 50% NaOH solution | 0.0629 |
| Water | 1.4788 |
| Lupasol ™ G-35 | 4.0000% |

EXAMPLE 2

Applications of Film Laminating Adhesive Compositions

PN-3830-F was blended with PEI in a similar manner as in Example 1. The performance was tested by drawing down two wet mils on Mylar and drying with a heat gun. The coated Mylar was then cut into strips and nipped to Stainless Steel (SS) for one minute. A 24 hour peel adhesion test (shear resistance) was tested by using a known method in the art. For example, the coated prepared Mylar tape was nipped to a 1.27 cm by 1.27 cm section on a SS plate. After a 30 minute dwell time, a 500 g weight was attached to the end of the tape. The sample had a static shear of >10,000. Surprisingly, the adhesion and resistance increased (higher values) when PEI was used in the blend showing the novelty of this invention.

EXAMPLE 3

Another example of the performance in Film/Film laminations can be found in Table I. In this case, PN-3830-F was diluted to 45% solids from 55% solids (PN-3830-J) and the acrylic/PEI blend (PD-8042) was diluted from 55% solids to 45% solids (PN-3830-K). The laminations were prepared by using a Geometric C/L-400 coater from Geometric Machines using a 180 Quad gravure cylinder. In all cases, the primary film was a 1 mil Borden AP3 Polypropylene. Secondary films were 75 gauge Borden AP3 Polypropylene, 1.5 mil Tredegar films and 75 gauge Quantum 440 Nortmat NMT. The coat weight, as expressed in dry kg/sq.m. of film is about 0.0024 (1.5 lbs/3000 sq. ft.).

TABLE I

FILM TO FILM LAMINATES WITH ACRYLIC/PEI BLENDS PEEL STRENGTH

| PRODUCT | PP/PP | | PP/PE | | PP/metPP | |
|---|---|---|---|---|---|---|
|  | 24 HR | 7 DAY | 24 HR | 7 DAY | 24 HR | 7 DAY |
| PN-3830 J | 404 g/lin cm | 462 g/lin cm | 289 g/lin cm | 289 g/lin cm | 289 g/lin cm | 404 g/lin cm |
| PN-3830 K | 1095 g/lin cm | Film Destructs | 1024 g/lin cm | Film Destructs | 663 g/lin cm | 980 g/lin cm |

NOTES:
(1) Film to Film laminates were prepared using a gravure cylinder application.
(2) PN-3830-J is PN-3830-F diluted to 45% solids.
(3) PN-3830-K is PN-3830-J neutralized with NaOH and contains Lupasol ™ G-35. The ratio is 96% PN-3830-J/4% Lupasol ® G-35.
(4) Peels are 180° at 34.48 cm/min. 2.54 cm wide strips of secondary film were pulled from primary film (Polypropylene in all cases).
(5) All the films above were treated to 34 dynes
PP = polypropylene
PE = polyethylene
metPP = metallized polypropylene The above examples have been depicted solely for the purpose of exemplification and are not intended to restrict the scope or embodiments of the invention. The invention is further illustrated with reference to the claims which follow hereto.

What is claimed is:

1. A film laminating adhesive composition comprising a stable blend of:
    a) at least one aqueous N-methylol-based polyacrylic dispersion; and
    b) at least one polyalkyleneimine.

2. The composition according to claim 1, wherein said laminating adhesive composition has a glass transition temperature of less than 25° C.

3. The composition according to claim 1, wherein the polyethyleneimine has a number average molecular weight distribution of from about 1,000 grams/mole to about 2,000 grams/mole.

4. The composition according to claim 1, wherein the solids content is from about 35% by weight to about 55% by weight.

5. The composition according to claim 1, wherein the viscosity is in the range of from about 10 cPs to about 200 cPs.

6. A film laminating adhesive composition according to claim 1 comprising a stable blend of
    (A) an aqueous dispersion which is a polymeric latex formed from
        (1) at least one N-methylol-based monomer, and additionally either:
        (2) at least one monomer selected from the group consisting of monoethylenically unsaturated monomer, in the form of an acid, ester, amide, or substituted derivative thereof, selected from acrylic monomers, methacrylic monomers, acrylamide, acrylate monomers, methacrylate monomers and mixtures thereof; at least one monomer selected from styrene, alpha-methyl styrene, alpha-olefin monomers, vinyl monomers and allylic monomers; and mixtures thereof; and
    (B) at least one polyalkyleneimine.

7. The composition according to claim 6 wherein the amount of N-methylol-based monomer is present in the said aqueous dispersion in a range of from about 0.5% by weight to about 3% by weight based on polymer solids.

8. A film laminating adhesive composition according to claim 6, wherein (A)(1) is an N-methylol-based monomer having the structure:

$$H_2C=\overset{R}{\underset{|}{C}}-Z-NH-CH_2OR_1$$

wherein
Z is C=O or $(CH_2)_x$,
R is hydrogen or $C_1$–$C_4$ alkyl,
$R_1$ is hydrogen or $C_1$–$C_4$ alkyl, and x is 0 to 6 units.

9. The composition according to claim 8, wherein the N-methylol-based monomer is N-methylol acrylamide.

10. The composition according to claim 8, wherein the N-methylol-based monomer is N-methoxy methyl acrylamide.

11. A film laminating adhesive composition according to claim 8, wherein the N-methylol-based monomer is present in the range of from about 0.5% to about 3% by weight based upon the polymer solids in the dispersion (A).

12. A film laminating adhesive composition according to claim 8 wherein the polymeric latex is formed from monoethylenically unsaturated monomer (A)(2).

13. A film laminating adhesive composition according to claim 8 wherein in the monomer (A)(1) R and $R_1$ are hydrogen and Z is C=O and the combination of monomer (A)(1) with any combination of monomers (A)(2) is chosen to produce a copolymer having a calculated glass transition temperature of no greater than +25° C.

14. A film laminating adhesive composition according to claim 6, wherein the monomer (A)(1) is N-methylol-based acrylamide, and the combination of N-methylol-based acrylamide with any combination of monomers (A)(2) is chosen to produce a copolymer having a calculated glass transition temperature of no greater than +25° C.

15. A film laminating adhesive composition according to claim 8 wherein said monomers (A)(2) are present in the range of from about 1% to about 99.6% of polymer weight in dispersion (A).

16. A film laminating adhesive composition according to claim 15 wherein said acrylate is present in the range of from about 40% to about 99% of polymer weight in dispersion (A).

17. A film laminating adhesive according to claim 8 wherein said monomer (A)(2) is an acrylate selected from $C_1$–$C_{20}$ alkyl(meth)acrylates.

18. A film laminating adhesive according to claim 17, wherein the (meth)acrylates are selected from the group consisting of: ethyl(meth)acrylate, methyl(meth)acrylate, isobornyl(meth)acrylate, isooctyl(meth)acrylate, 2-ethyl hexyl(meth)acrylate, isobutyl(meth)acrylate, butyl(meth)acrylate, isodecyl(meth)acrylate, lauryl(meth)acrylate, stearyl(meth)acrylate, hexyl(meth)acrylate and mixtures thereof.

19. A film laminating adhesive according to claim 8, wherein the aqueous dispersion (A) comprises the free radical polymerization product of (A)(1) N-methylol acrylamide and (A)(2) at least one member selected from the group consisting of butyl acrylate, methyl(meth)acrylate, and N-methyl(meth)acrylamide.

20. A film laminating adhesive composition for preparing bonded laminates, said bonded laminates being prepared by a method comprising the steps of:
   a) coating a first flexible film with the adhesive according to claim 6;
   b) heating the coated flexible film to form a dried coated substrate; then
   c) applying onto said substrate a second flexible film using heat and pressure.

21. The film laminating adhesive according to claim 20 wherein the substrate is selected from the group consisting of paper, polyethylene, polypropylene, polyester, nylon, ethylene, vinylacetate and cellophane, polyvinyl chloride, metallized films, aluminum foil.

22. A bonded laminate comprising at least two flexible films, said laminate being bonded with an adhesive according to claim 6.

23. A film laminating adhesive composition consisting essentially of a stable blend of:
   a) at least one aqueous N-methylol-based polyacrylic dispersion; and
   b) at least one polyethyleneimine.

24. A method for the preparation of a film laminating adhesive composition comprising the steps of:
   a) providing at least one aqueous N-methylol-based polyacrylic dispersion having a pH greater than about 7;
   b) providing at least one polyalkyleneimine component;
   c) mixing a) and b) together.

* * * * *

UNITED STATES PATENT AND TRADEMARK OFFICE
CERTIFICATE OF CORRECTION

PATENT NO. : 6,436,225 B1
DATED : August 20, 2002
INVENTOR(S) : Papsin, Jr.

It is certified that error appears in the above-identified patent and that said Letters Patent is hereby corrected as shown below:

Title page,
Item [*] Notice, delete "0" and insert -- 703 --.

Signed and Sealed this

Twenty-third Day of August, 2005

JON W. DUDAS
*Director of the United States Patent and Trademark Office*